Oct. 31, 1939.   J. E. GATES   2,178,339

CASH REGISTER AND ACCOUNTING MACHINE

Filed Feb. 14, 1938    6 Sheets-Sheet 1

| | ANY PUBLIC UTILITY CO. ANYWHERE, OHIO | | | | | ANY PUBLIC UTILITY CO. ANYWHERE, OHIO | | | | |
|---|---|---|---|---|---|---|---|---|---|---|
| 90 | JOHN DOE 00 BLANK ST. | | | OFFICE COPY | | JOHN DOE 00 BLANK ST. | | | CUSTOMER COPY | |
| CODE | PRESENT | PREVIOUS | CONSUMPTION | AMOUNT | DATE PAID | PRESENT | PREVIOUS | CONSUMPTION | AMOUNT | AMOUNT |
| 11 | 77800 | 77700 | 100 | JAN 3.50 ARREARS 1.50 CREDIT 4.00 AMT.DUE 1.00 | | 77800 | 77700 | 100 | JAN 3.50 ARREARS 1.50 CREDIT 4.00 AMT.DUE 1.00 | ARREARS 1.50 CREDIT 4.00 AMT.DUE 1.00 |

FIG. 3

Inventor
John Earl Gates
By
Earl Benst
His Attorney

Oct. 31, 1939.　　　J. E. GATES　　　2,178,339
CASH REGISTER AND ACCOUNTING MACHINE
Filed Feb. 14, 1938　　6 Sheets—Sheet 3

Inventor
John Earl Gates
By Earl Benst
His Attorney

Oct. 31, 1939.  J. E. GATES  2,178,339

CASH REGISTER AND ACCOUNTING MACHINE

Filed Feb. 14, 1938  6 Sheets-Sheet 4

FIG. 9

Inventor
John Earl Gates
By
Earl Benst
His Attorney

Oct. 31, 1939.  J. E. GATES  2,178,339

CASH REGISTER AND ACCOUNTING MACHINE

Filed Feb. 14, 1938   6 Sheets-Sheet 5

Inventor
John Earl Gates
By
Earl Benst
His Attorney

Oct. 31, 1939.  J. E. GATES  2,178,339
CASH REGISTER AND ACCOUNTING MACHINE
Filed Feb. 14, 1938    6 Sheets-Sheet 6

Inventor
John Earl Gates
By
*Karl Benst*
His Attorney

Patented Oct. 31, 1939

2,178,339

UNITED STATES PATENT OFFICE 2,178,339

CASH REGISTER AND ACCOUNTING MACHINE

John Earl Gates, Dayton, Ohio, assignor to The National Cash Register Company, Dayton, Ohio, a corporation of Maryland Application February 14, 1938, Serial No. 190,380

26 Claims. (Cl. 197—127)

REISSUED
MAY 7 - 1940

This invention relates to cash registers and accounting machine equipment, and has more particular relation to the slip ejecting mechanism employed in machines of the type illustrated and described in Letters Patent No. 1,916,535, issued July 4, 1933, to Bernis M. Shipley, and application for Letters Patent, Serial Number 730,880, filed June 16, 1934 by Charles H. Arnold, which issued on December 27, 1938, as Patent No. 2,141,332.

It is a common practice among public utility companies supplying communities with electricity and gas to furnish customers periodically with statements of their accounts. Such statements, before being mailed out to the customers, are each composed of a plurality of detachable portions; namely, an office copy, a customer's bill, and a cashier's stub. Each of the different portions of the statement bears the same information identifying that particular account and the amount due for electricity and gas.

For mailing purposes, the statement is printed on paper of substantially the same thickness as a standard Government postal card. After detaching the office copy portion from the statement, the remaining customer's bill, together with a cashier stub, is of appropriate size for mailing as a postal card to the customer.

Therefore, the machine embodying the present invention is constructed to handle statement sheets of varying thicknesses with equal efficiency, thus increasing the scope of the invention. The statement sheets can be handled more rapidly and with greater accuracy, resulting in the saving of time and labor of the operator.

The present invention, therefore, includes novel means for ejecting and inverting the statement after the necessary data has been printed thereon. Therefore, when the operator removes the statements from the storage receptacle, they will be in proper order, either numerically or alphabetically, depending upon the system used by the operator when inserting them singly in the machine to have the records printed thereon.

It is therefore an object of this invention to provide a novel combination of means to control the constant and/or variable feed and ejection of record material before and after the same has been printed upon.

Another object is to provide a plurality of feeding means for record material in combination with a novel ejecting means, all of the feeding means and the ejecting means being controlled as to time of operation by a group of manipulative devices and their associated mechanisms.

Another object of this invention is to provide novel means for ejecting the record material from the machine after the desired data has been printed thereon.

Another object is to provide means which is equally efficient for ejecting and inverting record materials of variable thicknesses from the printing mechanism after the desired data has been printed thereon.

With these and incidental objects in view, the invention includes certain novel features of construction and combinations of parts, the essential elements of which are set forth in appended claims and a preferred form or embodiment of which is hereinafter described with reference to the drawings which accompany and form a part of this specification.

GENERAL DESCRIPTION

The present invention is shown embodied in a machine of the type illustrated and described in the patents hereinbefore referred to. This machine is equipped with a column-type printer located in the front of the machine, said printer being adapted to print corresponding amounts and data on each of the different portions comprising a statement slip.

The statement slip is manually inserted by the operator into the machine, and upon operation of the latter, the slip is automatically fed rearwardly to printing position. If entries are to be made on more than one line of the slip, depressing the proper control key causes the statement slip to be automatically line-spaced after the proper entries have been made on each of the desired lines. In the final operation, depressing the proper control key causes the slip feeding means to return the slip forwardly into an ejecting chute from which the ejecting mechanism ejects the slip.

In the process of ejection, the slip is inverted or turned face downwardly and deposited in a receptacle located at the front of the machine. Turning the slips face downwardly causes them to be stacked in the receptacle in proper sequential order. If printing is to take place only on one line, depressing the proper control key causes the slip feeding mechanism, immediately after the last entry is made on the one line, to return the slip forwardly into the ejecting chute preparatory to being ejected from the machine.

It will be understood that all the entries on a single line are not necessarily made during one machine operation, but may be the result of several machine operations. However, the slip may be line-spaced or returned to the ejecting chute as desired, in the last of a series of operations, by depressing the proper control key.

Selecting mechanism, controlled by the transaction keys and total keys, and automatically controlled in certain instances, controls the slip feeding and ejecting mechanisms.

Only the mechanism which is pertinent to the present invention will be described herein, and reference may be had to the above mentioned patents for a full understanding of the remaining mechanism of the machine.

DETAILED DESCRIPTION

*Driving mechanism*

Figure 13:
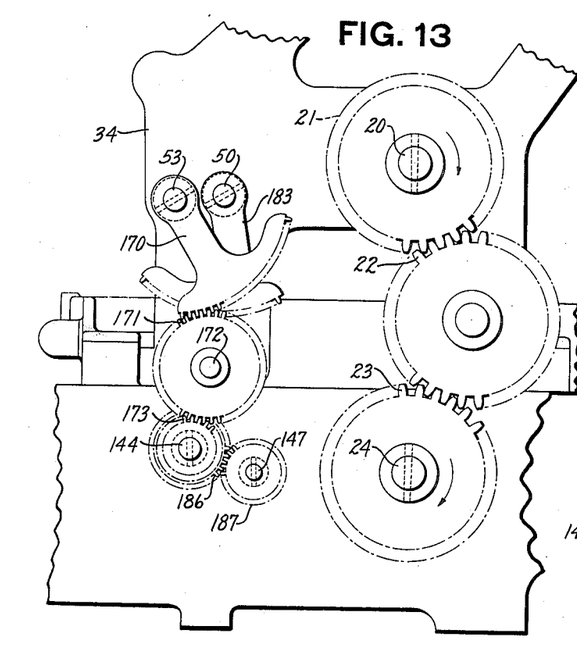
Fig. 13 shows a portion of the joint control mechanism for differentially adjusting the means for controlling the operation of the feeding and ejecting mechanisms.

The illustrated machine embodying the present invention is provided with a main drive shaft 20 (Figs. 4 and 13) which may be either hand or motor driven, preferably the latter. The shaft 20 receives one complete clockwise rotation during each adding operation and two complete clockwise rotations during total taking operations. Each complete clockwise rotation of the shaft 20 is referred to hereinafter as a cycle of operation of the machine. The same movement imparted to the shaft 20 is, through gears 21, 22 and 23 (Fig. 13) transmitted to a printer drive shaft 24. The shaft 24 (Figs. 4 and 6), in turn, operates the slip feeding and ejecting mechanisms, as will be hereinafter described in detail.

*Keyboard*

Figure 1:
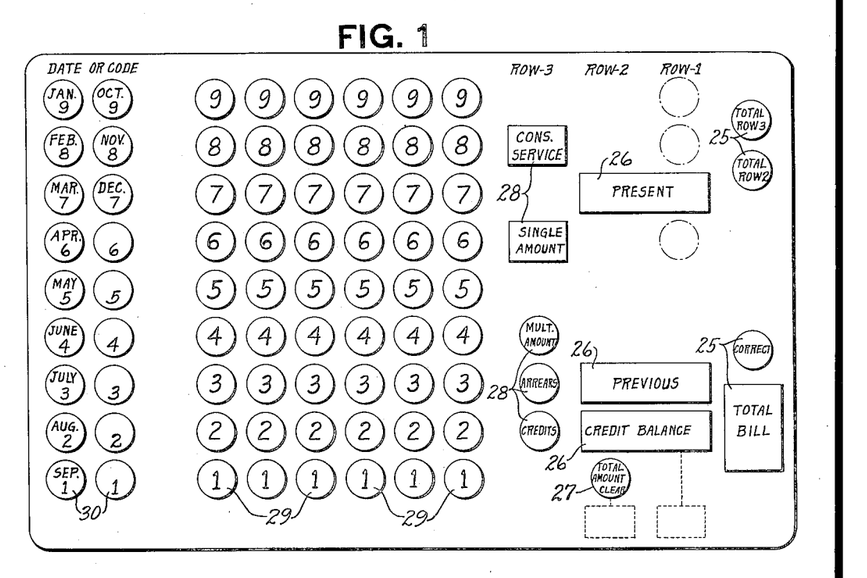
Fig. 1 is a diagrammatic view of the keyboard of the present machine.

The keyboard of the present machine is shown in diagrammatic form in Fig. 1 and is especially arranged for use in connection with systems employed by public utility companies. Located at the extreme right on the keyboard is a row of total control keys 25, to control the reading and resetting of various totalizers and also exercise control over the operation of the slip feeding and ejecting mechanisms. Next to the left are rows of transaction or totalizer selecting keys 26, 27 and 28 for selecting the various totalizers for operation. In addition, the keys 26 and 28 also control the operation of the slip feeding and ejecting mechanisms.

There are also included a plurality of banks of amount keys 29 for entering various amounts into the machine. Arranged to the left of the keys 29 are two banks of "date" or "code" keys 30, used for controlling the printing mechanism in printing dates and code numbers. Such code numbers are used to designate different rates charged to the various consumers, such rates being based upon the amount of electricity and gas which they consume. The keys are all supported in the usual key frames 31 (Fig. 4) supported on rods 32 and 33 carried by the machine side frames 34, only one of which is partially shown.

*Differential mechanism*

The differential mechanism associated with the banks of amount keys 29 is substantially the same as that shown in the Arnold and Shipley patents above referred to and has not been shown in this case.

Figures 4, 5:
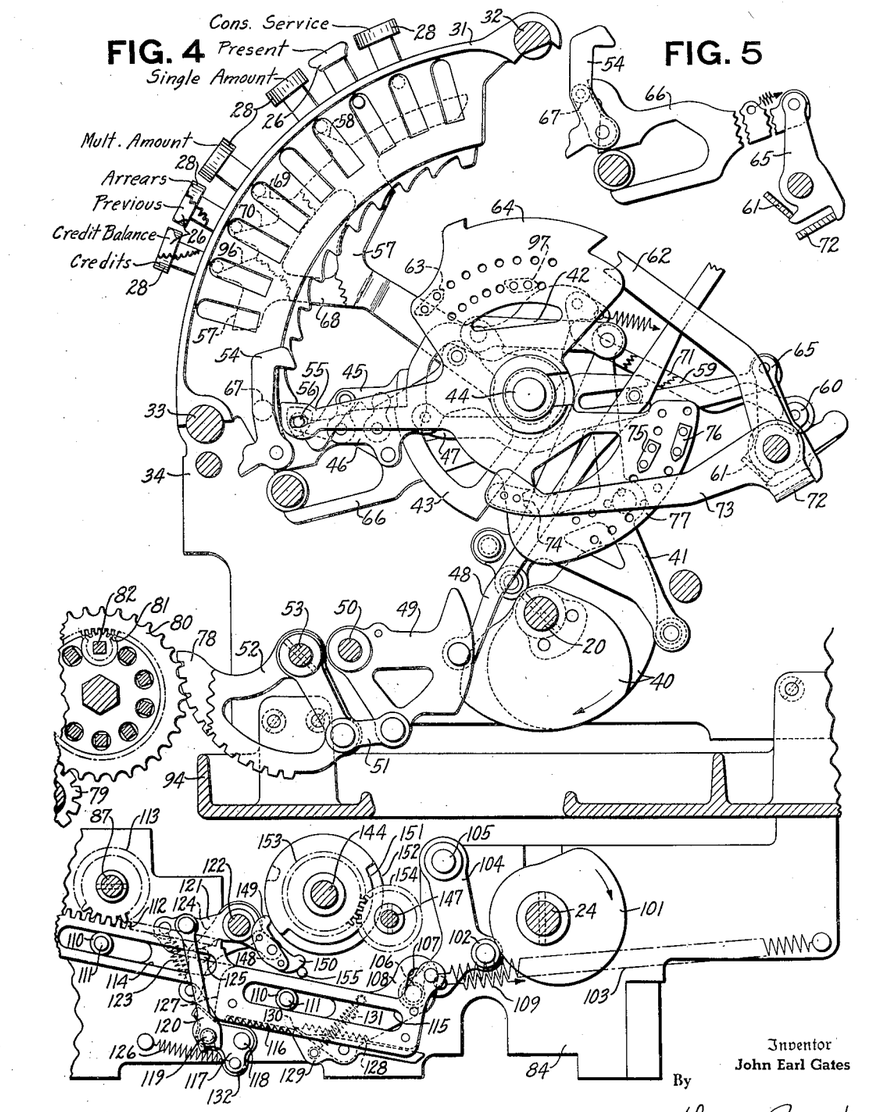
Fig. 4 is a right-hand side elevation showing the differential mechanism in the first bank or "row 1" and the keys in "row 1" and "row 3" with means to control said differential from "row 3" to control the feeding and ejecting mechanisms.
Fig. 5 is a detail view showing the means to operate the zero stop pawl in row 1 by certain keys of row 3.

The differential mechanism in the first control bank or row 1, which is controlled by the keys 25 and certain of the keys 28 of row 3, is illustrated in Fig. 4 and will be briefly described, as it is similar to the control differentials illustrated and described in the previously mentioned Shipley Patent No. 1,916,535.

The drive shaft 20 carries a pair of cams 40 for operating a lever 41 connected by a link 42 to the usual driving segment 43. The driving segment 43 and other parts of the differential mechanism are supported by a rod 44.

Clockwise movement of the driving segment 43, through the usual latch 45 carried by a differentially adjustable arm 46 supported by the rod 44, rocks the arm 46 clockwise until the forward end of the latch 45 contacts whichever of the keys 26 are depressed, at which time the latch is separated from the driving segment permitting the arm 46 to remain in the position to which it has been driven under control of the depressed key 26.

The differential arm 46 carries the usual minimum movement beam 47 connected to a link 48 connected to an arm 49 loose on a shaft 50 supported by the frames 34. A link 51 connects the arm 49 with a segment 52 secured to a shaft 53 carried by the frames 34. The segment 52, by means not shown, sets a symbol type wheel to print on an audit strip as disclosed in the Arnold patent.

The shaft 53, through means to be later considered in detail, operates certain control means in the printer depending upon the type of entry being made on the statement slip.

The usual zero stop pawl 54 is carried by the frame 31 to cooperate with an arm 55 supported by the rod 44 and has a slot to cooperate with a pin 56 of the latch 45 whereby when none of the keys 26 are depressed the latch 45 is disconnected by the driving segment 43 so that the differential mechanism is stopped in the zero position.

Under certain conditions it is necessary to control this differential mechanism of Fig. 4, which it will be recalled is located in row 1, by certain of the keys 28 in row 3.

Associated with the "single amount" key 28 of row 3 is a lever 57 having a node 58 by means of which the lever 57 is rocked counter-clockwise by depression of this key. Connected to the lever 57 is a link 59 pivoted to an arm 60 of a yoke 61 having an arm 62 adapted to cooperate with a lug 63 on a plate 64 integral with the differential arm 46. The lug 63 is in such a position that when the arm 46 is driven by the means above described, said arm 46 adjusts the shaft 53 to the ninth position to control the slip feeding mechanism as will be hereinafter described.

When the yoke 61 is rocked by depression of the "single amount" key 28, it rocks an arm 65 counterclockwise thus moving a slide 66 forwardly which, by its contact with a pin 67 on the zero stop pawl 54, moves the latter into an ineffective position so that the differential will be controlled by the depressed key 28 instead of by the zero stop pawl 54.

A lever 68 is also located in row 3 and has nodes 69 and 70 which cooperate with the "multiple amount" and "arrears" keys 28 respectively, and is rocked counterclockwise different distances due to the shapes of the nodes 69 and 70. This lever 68 is connected by a link 71 to an arm (like the arm 65) of a yoke 72 which has an arm 73 carrying a stop 74 adapted to cooperate with lugs 75 and 76 of a plate 77 also integral with the differential arm 46.

In case of the depression of the "multiple amount" key 28, the node 69 is shaped so as to move the arm 73 one step to position the stop 74 in the path of the lug 75 thus causing the differential arm 46 to adjust the shaft 53 to the sixth position to control the printer feeding mechanism as will be later mentioned.

When the "arrears" key 28 is depressed, the node 70 is of such a shape that the arm 73 positions the stop 74 in the path of the lug 76 whereby the differential arm 46 adjusts the shaft 53 to the eighth position to control the printer feeding mechanism as will be also hereinafter mentioned.

When the yoke 72 is moved by either the "multiple amount" or "arrears" key 28, it rocks the arm 65 counter-clockwise whereby the slide 66 moves the zero stop pawl 54 to an ineffective position to permit the differential to be adjusted under control of certain keys.

Upon depression of the "consumption service" key 28 of row 3, neither of the levers 57 nor 68 is moved and therefore the zero stop pawl 54 remains in its effective position to control the differential mechanism to be stopped at zero, whereby the printer is appropriately controlled as will be hereinafter described.

The "credits" key 28 cooperates with a node 96 on the lever 57. This node 96 causes the arm 62 to be positioned in the path of a lug 97 on the plate 64 to control the adjustment of the differential arm 46 whereby it will be stopped in the second position to control the printer feeding mechanism.

It will thus be seen from the above that no matter which one of the transaction keys 26 or 28 is depressed, the differential mechanism for controlling the operation of the slip feeding and ejecting mechanisms will be differentially controlled thereby.

Depression of any one of the keys 25, 26 or 28 also releases the machine for operation.

The differential mechanism associated with the amount keys 29 has not been shown in this case. To control the printing of amounts and other data in the several columns of the slip shown in Fig. 2, differential mechanism like that shown in the previously mentioned Arnold and Shipley patents is used.

*Printing mechanism*

The printing mechanism used in connection with the present invention is of the column printer type shown in the above mentioned Arnold patent and prints the same amounts and other data in various columns. The amount keys 29 differentially control segments 78 (Fig. 4). The method of driving the columns of type wheels 79 (only one of which is shown), from the differentially positioned segments 78 is by means of ring gears 80 having external and internal teeth. These gears 80 are positioned by their external teeth, and pinions 81 driven by the internal teeth operate square shafts 82 carrying similar pinions, one for each column in which printing is to be duplicated. The latter pinions drive gears (not shown) which drive type wheels 79. This method of driving type wheels is fully disclosed in United States Patent No. 1,693,279, issued November 27, 1927, to Walter J. Kreider, and reference may be had thereto for a full understanding of the same.

Figure 2:
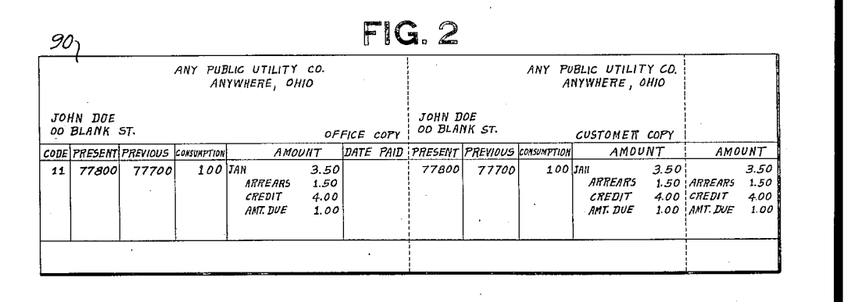
Fig. 2 is a facsimile of the form of statement slip used in the present machine.

To print from the type wheels upon the slip of Fig. 2, there is provided a group of impression hammers 83 (Fig. 6) only one of which is shown.

*Feeding mechanisms*

In the instant machine, statement slips (Fig. 2) are presented to a line-spacing and feeding means by the operator. At the beginning of a machine operation the slip is advanced by said line-spacing and feeding means so that the first printing line thereon is alined with the impression hammers 99. The entries on one line generally consist of the result of several machine operations. Before releasing the machine for the last operation on the first line, that is, the printing of the amount based on consumption, the operator ascertains whether or not the slip is to be line-spaced. If so, depressing the "multiple amount" key 28 (Fig. 1) conditions the line-spacing and feeding means to line-space the slip during the initial part of the succeeding operation. If the slip is not to be line-spaced, depressing the "single amount" key 28, in the amount entering operation, for the first line of printing causes the slip, after the desired printing is made thereon, to be fed forwardly by said line-spacing and feeding means into a position to be fed, by another feeding means, into an ejecting chute. The slip ejecting mechanism then ejects the slip from the chute face downwardly into a suitable receptacle located in the front of the machine.

The line-spacing and feeding means will now be described in detail. Journaled in printer frames 83, 84, 85 and 86 (Figs. 6, 9 and 10), is a shaft 87, having secured thereon a pair of line-spacing and feeding discs 88, having formed in the periphery thereof right-angled cuts 89. The abrupt vertical surfaces of cuts 89 in the discs 88 and a pair of arms 98 (Figs. 6, 9 and 10) secured to the shaft 87, form locating stops for a statement slip 90 (Fig. 2) when the latter is manually inserted into the machine. Cooperating with each of the discs 88 is a pressure roller 91 carried by an arm 92 pivoted to a bracket 93 secured to a base plate 94 of the machine. Torsion springs 95 are tensioned to maintain the peripheries of the rollers 91 in cooperative relation with the peripheries of the discs 88. The cuts 89 in the discs 88 provide sufficient clearance between the latter and the pressure rollers 91 to permit the insertion of the slip 90 before operating the machine.

Upon operation of the machine, the discs 88 are rotated clockwise, to feed the inserted slip 90 rearwardly into the proper position for printing on the first printing line thereof, by a cam disc 101 (Fig. 4) through means which will now be described.

The cam 101 is secured to the shaft 24 and receives one complete clockwise rotation during each adding operation and two complete clockwise rotations during each total taking operation. When the cam rotates, the periphery of the cam 101 coacts with a roller 102 carried by an arm 104 and rocks the latter in a clockwise direction. The arm 104 is pivoted on a stud 105 carried by the frame 84, and carries a stud 106 which projects through a slot 107 formed in a slide 108. A spring 109 (Figs. 4 and 9) constantly urges the arm 104 counter-clockwise. The slide 108 (Figs. 3 and 4) is mounted for reciprocating movement by means of parallel slots formed therein, which coact with rollers 110 loose on studs 111 mounted in the frame 84.

Figure 3:
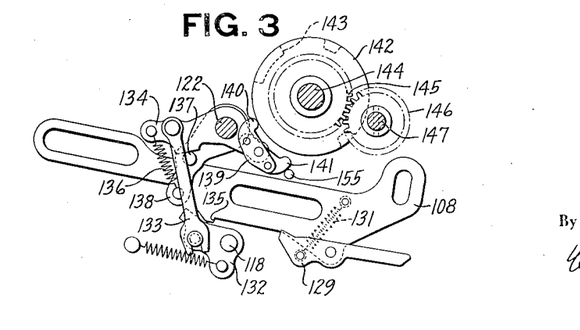
Fig. 3 is a detail of a portion of the slip-spacing and feeding means control.

It will thus be seen that the when the arm 104 is given its clockwise movement, as just described, it will likewise shift the slide 108 to the left (Figs. 3 and 4). Such shifting movement of the slide 108 is transmitted, by means to be presently described, to a rack 112 engaging a gear 113 secured to the shaft 53 to actuate the feeding disc 88 clockwise to feed the inserted slip 90 rearwardly to the proper printing position. The rack 112 is also mounted for reciprocating movement by means of parallel slots 114 and 115 which coact with the rollers 110 on the studs 111.

The lower edge of the rack 112 has teeth 116 cooperating with pawl 117 pivoted on a stud 118 in the frame 84. The pawl 117 has a stud 119 cooperating with a bifurcated link 120 pivoted to a lever 121 loose on a shaft 122. The lever 121 is flexibly connected by a spring 123 to an arm 124 secured on the shaft 122. A stud 125 of the arm 124 maintains said arm and the lever 121 in their normal positions under the influence of the spring 123. A spring 126 urges the pawl 117 in a clockwise direction.

Secured to the side of the rack 112 is a plate 127 having teeth 128 adapted to cooperate with a pawl 129 pivoted on the slide 108. Normally the pawl 129 is held in contact with a shoulder 130 of the plate 127 by a spring 131.

Also pivoted on the stud 118 (Figs. 3 and 4) is a spring operated pawl 132 cooperating with a link 133 connected to a lever 134 loose on the shaft 122. The pawl 132 cooperates with a shoulder 135 of the slide 108 after the same has been moved to the left as will be later described. A spring 136 normally holds the lever 134 in contact with a stud 137 of an arm 138 secured to the shaft 122. Pivoted to the lever 134 is a feeler 139 having fingers 140 and 141 cooperating with selecting discs 142 and 143. The selecting disc 143 is secured to a shaft 144 and the disc 142 is loose on the shaft and has secured thereto a gear 145 meshing with a gear 146 secured to a shaft 147.

Referring to Fig. 4, the lever 121 has a feeler 148 with fingers 149 and 150 cooperating with selecting discs 151 and 152. The disc 152 is secured to the shaft 144 and the disc 151 is loose thereon and has secured to the side thereof a gear 153 meshing with a gear 154 secured to the shaft 147. A stud 155 prevents the fingers of the feelers 139 and 148 from stumbling on the mutilated edges of the selecting discs when the parts are in their normal positions.

To rock the shaft 122 at the proper time so that the feelers may cooperate with the selecting discs, the shaft has secured thereto an arm 161 (Figs. 7 and 10) connected to a pitman 162 having a roller 163 cooperating with a cam race 164 of a box cam 165 secured to the printer drive shaft 24.

The race 164 rocks the shaft 122 counter-clockwise and then clockwise to its normal position once during each cycle of operation of the machine.

The means for adjusting the selecting discs 143 and 152 to control the line spacing and feeding means is operated by the differential mechanism of Fig. 4. It has been described how the shaft 53 is differentially positioned. Secured to this shaft 53 (Fig. 13) is a segment 170 meshing with a gear 171 on a stud 172. The gear 171 meshes with a gear 173 secured to the shaft 144.

Since the feeding control discs 143 and 152 are secured to the shaft 144 it will be clear that said discs are adjusted under the control of the transaction keys.

Figure 14:
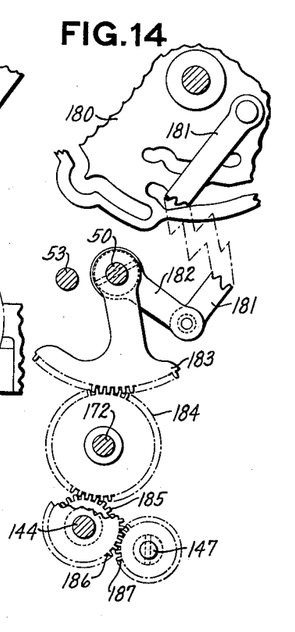
Fig. 14 is a side elevation of a portion of the mechanism controlled by the total control keys for governing the operation of the feeding and ejecting mechanisms.

The discs 142 and 151 of Figs. 3 and 4 are adjusted by the usual total control plate 180 (Fig. 14) which has pivoted thereto a link 181 connected to an arm 182 fastened on the shaft 50. Also secured to the shaft 50 is a segment 183 meshing with a gear 184 loose on the stud 172. The gear 184 meshes with the gear 185 secured to a gear 186 meshing with a gear 187 fastened to the shaft 147.

Movement of the total control plate 180 adjusts the shaft 147 according to the position in which said plate is set under control of the keys 25 (Fig. 1) whereby the gears 146 and 154 adjust the discs 142 and 151 during total taking operations.

Upon release of the machine for operation, the clockwise movement of the shaft 24 causes the cam 101 (Fig. 4) to move the arm 104 clockwise to shift the slide 108 to the left whereupon the pawl 129 by its contact with the surface 130 of the plate 127 moves the rack 112 in unison with the slide. After the cam 101 moves the slide 108 and rack 112 to the left their full distance, the retaining pawl 132 engages the projection 135 of the slide 108 and the pawl 117 engages the first of the series of teeth 116 of the rack 112 to retain the slide 108 and rack 112 in their moved positions.

Such movement of the rack 112 rotates the gear 113 and feeding disc 88 clockwise which in cooperation with the pressure rolls 91 feeds the slip 90 to the right until the first printing space thereon is alined with the impression hammers 83.

Immediately after the rack 112 and slide 108 receive their full movement to the left, the discs 143 and 151 are positioned so that there are no notches opposite the fingers of the feelers 139 and 148, thus blocking any counter-clockwise movement of the levers 121 and 134. Consequently, any movement of the arms 124 and 138 by the cam 165 flexes the springs 123 and 136 and therefore there will be no feeding of the slip 90 during the printing thereon of data representing the "present reading," the previous reading," the "consumption and code" which must be printed on one line.

When there is no further printing to take place than that which is on the first line of the slip, as viewed in Fig. 2, and during the operation in which the amount is printed thereon, the discs 143 and 152 are adjusted under control of the "single amount" key 28 to position a low spot on each disc 143 and 152 opposite the fingers 141 and 150 whereby the pawls 117 and 132 may be disengaged from the teeth 116 and shoulder 135 respectively, thus permitting the spring 109 to restore the slide 108 to its normal position and permitting the spring 183 to restore the rack 112 to its normal position. During such movement of the rack 112, the discs 88, compression rolls 91 and the arms 98 feed the slip 90 to the left into a position to be engaged by another slip feeding mechanism to be later described which latter feeding mechanism feeds the slip into a position to be ejected from the machine.

For a more detailed operation of the feeding mechanism, reference may be had to the above mentioned Arnold patent.

In the above operation, that is, when printing on only a single line of the slip, the machine is released during the printing of the amount by the "single amount" key 28 as stated above.

When it is necessary to print data on different successive lines of the slip 90, it takes three operations of the machine to print the present reading, the previous reading, the code and the consumption data. During these operations the slip is not fed. Upon the printing of the first amount in the first line, the machine is released by the use of the "multiple amount" key 30 which controls the differential mechanism of Fig. 4 so that the disc 143 is set so that a notch is opposite the finger 141. Now upon clockwise movement of the shaft 122, the arm 138 moves the lever 134 counter-clockwise to disengage the pawl 132 from the projection 135, thus slide 108 is free to follow the cam 101 back to normal position. The movement of the slide 108 does not affect the rack 112 which remains in its moved position, where it is held by the pawl 117. In the first part of the succeeding operation and prior to the time that an impression is taken, the slide 108 is again moved forward by the cam 101 whereupon the pawl 129 engages the first of the several teeth 128 whereby the rack 112 is moved one step to line space the slip 90. The pawl 117 now engages the second tooth 117 of the rack 112 to retain it in such position. This step by step movement of the rack continues, one step for each operation, to feed the slip 90 step by step, until the items are all printed. To print the amount due, the "total bill" key 25 is pressed, which through the discs 142 and 151 (Figs. 3 and 4) controls the feeding disc 88 to feed the slip into a position to be operated upon by another feeding mechanism to be hereinafter described.

After all of the necessary data has been printed on the slip 90 it, as above described, is fed forwardly by the feeding discs 88 and arms 98 into a position to be fed still further by a second feeding means which feeds it into position to be ejected from the machine. Said feeding means will now be described.

Figures 6, 7:
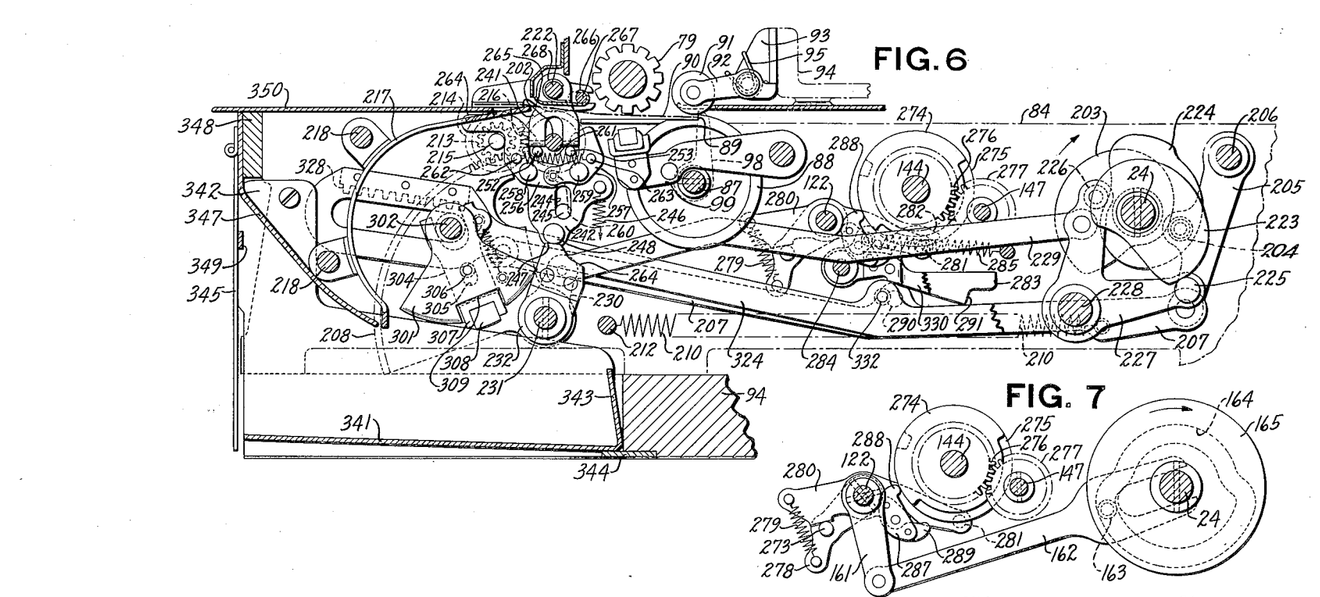
Fig. 6 is a side elevation of the feeding and ejecting mechanisms and the means for controlling the operation thereof.
Fig. 7 is a detail of the mechanism for actuating the means for controlling the operation of the feeding and ejecting mechanisms.
Figure 9:
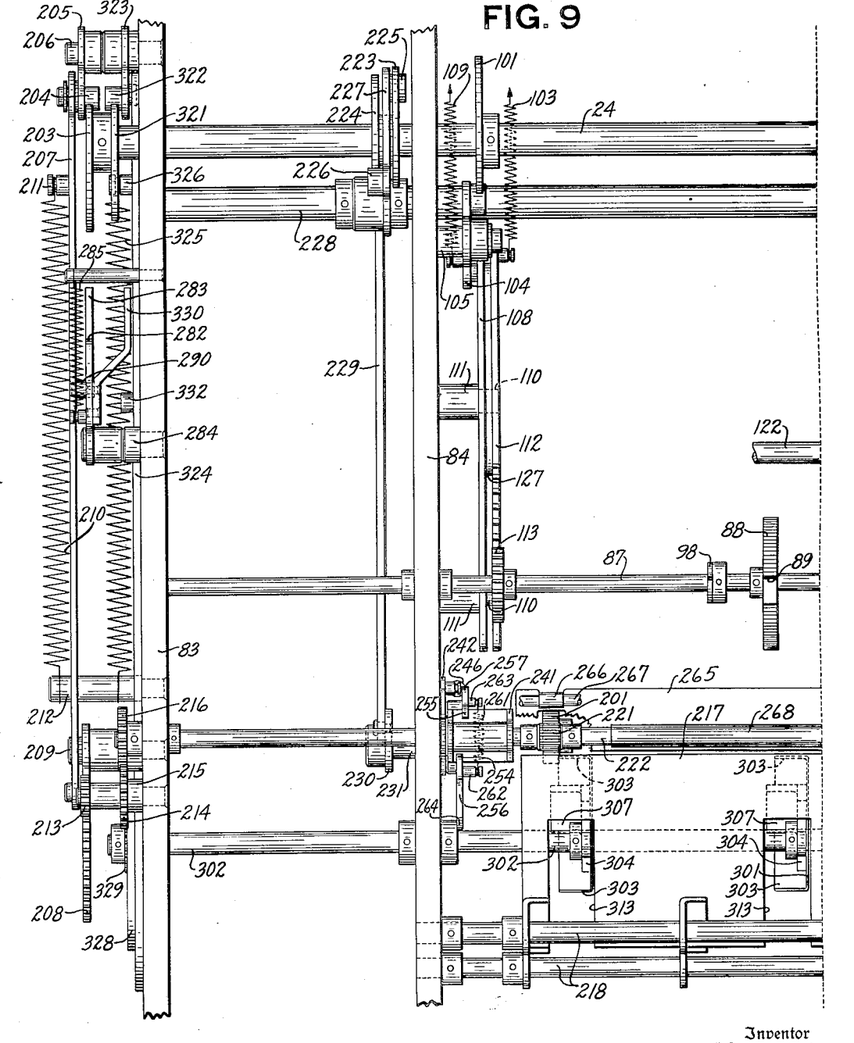
Figs. 9 and 10 combined constitute a top plan view of the ejecting mechanism.
Figures 10, 11, 12:
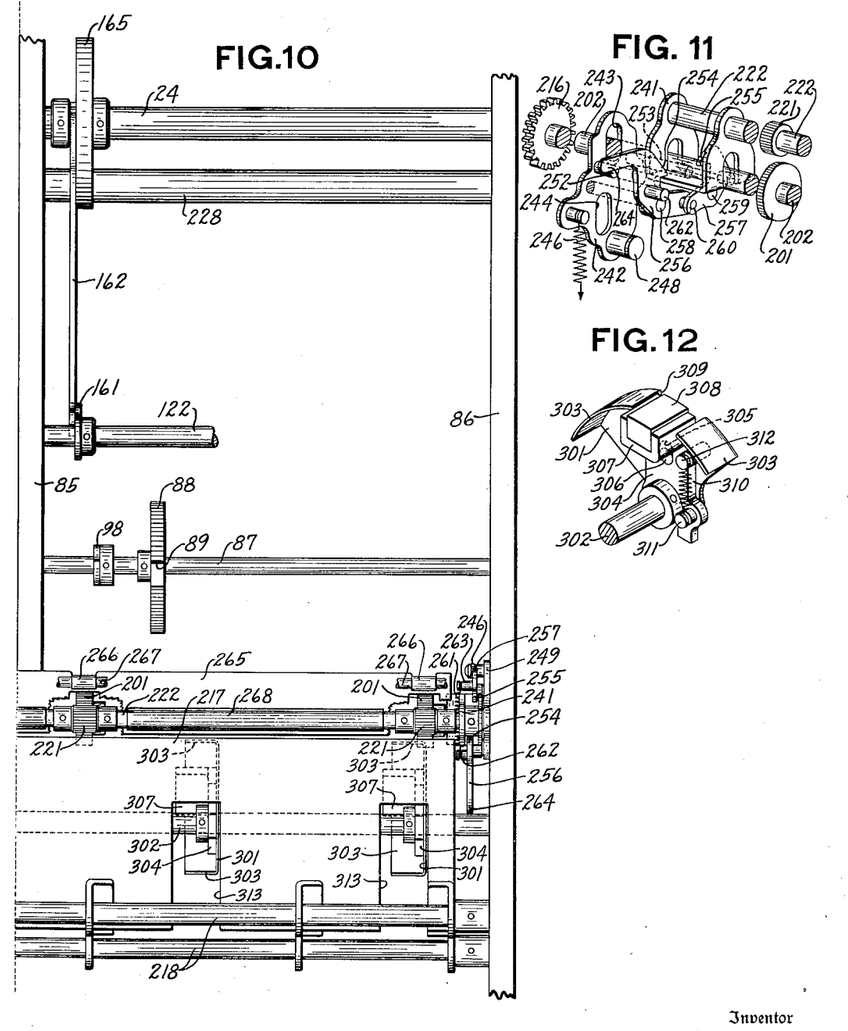
Fig. 11 is a disunited perspective view of the mechanism for controlling the operation of that portion of the feeding mechanism which feeds the slip into the ejecting chute.
Fig. 12 is a detail perspective view of one of the ejecting devices.

Feeding rolls 201 Figs. 6, 9 and 10 are secured on a shaft 202, suitably mounted in the frames 83 to 86 inclusive. The rollers 201 are actuated by a cam 203 (Fig. 6) secured on the shaft 24 to receive a complete clockwise rotation during each cycle of operation of the machine. During each clockwise movement, the cam 203 coacts with the roller 204 (Fig. 9) carried by an arm 205, loosely mounted on a stud 206 carried by the frame 83, and rocks said arm 205 counter-clockwise. A link 207 (Fig. 9) connects the lower end of the arm 205 to a gear segment 208, freely mounted on a stud 209 carried by the frame 83. A spring 210, stretched between a stud 211 on the link 207 and a stud 212 in the frame 83, normally maintains the roller 204 in cooperative relation with the cam 203 and tends to hold the link 207 in its full forward position.

The segment 208 meshes with a gear 213 secured by a sleeve to another gear 214. The gears 213 and 214 are both loosely mounted on a stud 215 carried by the frame 83. The gear 214 in turn meshes with a gear 216 secured to the shaft 202, which carries the feeding rollers 201. It will thus be seen from the above that when the arm 205 is rocked counter-clockwise by the cam 203, as previously described, it will, through the link 207, rock the segment 208 in a clockwise direction (Fig. 6). During such movement, the segment 208 rotates gears 213 and 214 counter-clockwise, and the latter, meshing with gear 216, will in turn rotate the shaft 202 and feeding rollers 201 idly in a clockwise direction.

After the segment 208 is thus rocked clockwise by the cam 203, the link 207 is returned forwardly to its home position by the spring 210. This causes the segment 208 to be rocked counter-clockwise and, through the train of gears above mentioned, rotates the feeding rollers 201 counter-clockwise. It is during such counter-clockwise movement that the rollers 201 coact with the slip 90 to feed it into the ejecting chute 217 secured on rods 218 mounted in the frames 83 and 86 (Figs. 9 and 10).

However, in order for the rollers 201 to be thus effective in feeding the slip 90 into the chute 217, a plurality of pressure rollers 221 (Figs. 9, 10 and 11) must first be moved down to grip the slip 90 between themselves and the rollers 201. The pressure rollers 221 are secured on a shaft 222 and are moved into and out of cooperative relation with the feeding rollers 201 by a pair of cams 223 and 224 (Figs. 6 and 9) through means which will now be described.

The cams 223 and 224 are secured to the shaft 24 and receive a complete clockwise rotation during each cycle of operation of the machine. Said cams 223 and 224 coact with rollers 225 and 226, respectively, carried by a bell crank 227 pivoted on a rod 228 carried by the frames 82 to 86 inclusive. The cams 223 and 224 are of irregular shape for the purpose of rocking the bell crank 227 first clockwise and then counterclockwise during each cycle of operation of the machine.

The bell crank 227 is connected by a link 229 to an arm 230 secured to a shaft 231 journaled in the frames 84 to 86 inclusive. The movement of the bell crank 227 is, through the link 229, transmitted to the shaft 231. Secured on the shaft 231 is a pair of supporting arms 232 (only one of which is shown), which participates in the different movements imparted to the shaft 231.

Figure 8:
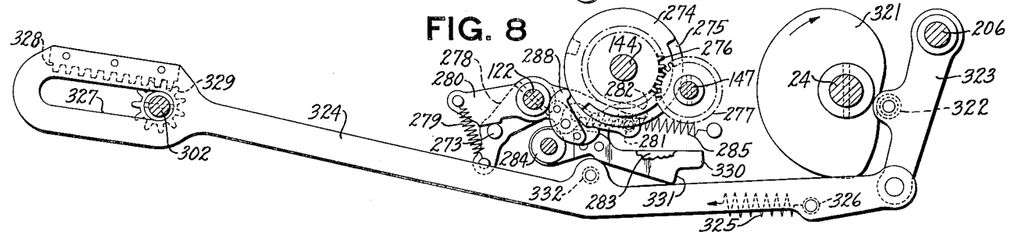
Fig. 8 is a detail of the actuating means for the ejecting mechanism, together with a portion of the mechanism for controlling the operation thereof.

The supporting arms 232 normally serve, through means to be presently described, to maintain the shaft 222 in an elevated position so that the pressure rollers 221 are out of cooperative relation with their associated feeding rollers 201 (Fig. 11). The shaft 222 is rotatably mounted in two yokes 241 (Figs. 7, 8 and 9) which are bifurcated to straddle the shaft 202.

Associated with the left-hand yoke 241 (Figs. 6, 9 and 10) is a plate 242 mounted for vertical movement by means of slots 243 and 244 (Figs. 6 and 11) which coact with the shaft 202 and a stud 245, respectively. The stud 245 is carried by the frame 84. The plate 242 is urged downwardly by the spring 246 but is normally restrained from doing so by a surface 247 on the supporting arm 232 bearing against the stud 248 on the plate 242. Associated with the right-hand yoke 241 (Fig. 10) is a plate 249, which is like the plate 242 and which functions in the same manner. Thus, the arms 232 normally maintain the plates 242 and 249 in their elevated positions to hold the shaft 222 in an elevated position so that the pressure rollers 221 are out of cooperative relation with the feeding rollers 201.

The yokes 241 each rest on a pair of studs 252 and 253 (Fig. 6) carried by the plate 242 and the plate 249 (Figs. 9 and 10). Hooked over the sides of the yokes 241 are projections 254 and 255 (Figs. 6, 9, 10 and 11) formed on levers 256 and 257 pivotally mounted on studs 258 and 259, respectively, carried by the plates 242 and 249. The rear end of each lever 256 is bifurcated to embrace a stud 260 on each lever 257, while springs 261 (Figs. 6, 9 and 10), stretched between pins 262 and 263 on the levers 256 and 257, respectively, force the projections 254 and 255 to hold the lower sides of the yokes 241 down against the studs 252 and 253. Therefore, the yokes 241 follow the plates 242 and 249 in their downward and upward movements.

The particular means just described for holding the yokes 241, shaft 222 and feeding rollers 221, in cooperative relation with the plates 242 and 249, was designed to facilitate the removal to change printing ribbons. Each lever 256 has an extension 264, which may be grasped to manually rock the levers 256 counter-clockwise to remove the projections 254 from the side of the yokes 241. The levers 256, during such counter-clockwise movement, will through their toggle connections with the levers 257 rock the levers 257 clockwise to remove the projections 255 from the other side of the yokes 241. With both sets of projections 254 and 255 thus moved away from the yokes 241, the latter, together with the shaft 222 and pressure rollers 221, are free to be lifted out of the machine as a single unit.

When the supporting arms 232 are rocked counter-clockwise, as previously described, the surfaces 247 thereof will be removed from beneath the studs 248 in the plates 242 and 249 to allow the springs 246 to draw the plates 242 and 249 and yokes 241 downwardly to bring the pressure rollers 221 into cooperative relation with the feeding rollers 201. This renders the feeding rollers 201 effective to feed the statement slip 90 into the ejecting chute 217. After the slip 90 has been properly fed to the ejecting chute, the supporting arms 232 are rocked clockwise to normal position, as previously described. During such clockwise movement of the arms 232, cam surfaces 264 on the arms coact with the studs 248 to cam the plates 242 and 249 upwardly to their normal elevated positions, whereupon said plates, through the yokes 241, raise the pressure rollers 221 to their normal ineffective positions.

To insure that the slip 90 is fed, by the rollers 201 and 221, into the ejecting chute 217, and not out through the opening above the top edge of the chute, a guide plate 265 (Figs. 6, 9 and 10) is pivoted by ears 266 on a rod 267 supported by the frames 84 to 86. The plate 265 has secured thereto clips 268 partially surrounding the shaft 222.

When the shaft 222 is lowered, as above described, to bring the rollers 221 into contact with the slip 90 to feed the same, the guide plate 265 is rocked counter-clockwise about the rod 267 to close the opening above the upper edge of the chute 217, whereby the slip 90 is guided into the chute 217 by the rollers 201 and 221 preparatory to being ejected, by means to be later described.

Means is provided for controlling the operation of the feeding rollers 201 so that the latter will not feed the inserted slip 90 to the ejecting chute 217 until after all of the desired data have been printed on said slip and the slip is fed forwardly by the feeding disc 88, as previously described. This means includes notched discs 274 and 275 (Figs. 6, 7 and 8) similar to the discs 151 and 152 previously described. The disc 274 is secured to the shaft 144 and is differentially adjusted under control of the transaction keys 26 and 28. The disc 275 is loose on the shaft 144 and has secured thereto a gear 276 meshing with a gear 277 secured to the shaft 147 which is adjusted under control of the total control keys 25.

Associated with the discs 274 and 275 is an arm 278 secured to the shaft 122. A stud 273 in the arm 278 is held against a lever 280 by a spring 279. The lever 280 is loose on the shaft 122 and carries a stud 281 contacted by a finger 282 of a pawl 283 pivoted on a stud 284 (Figs. 6 to 10) carried by the frame 83. A light spring 285 holds the finger 282 against the stud 281.

The lever 280 has pivotally mounted thereon a feeler 287 having fingers 288 and 289 adapted to coact with the peripheries of the discs 274 and 275, respectively. The finger 288 normally coacts with the disc 274, while the finger 289 is normally out of cooperative relation with the disc 275. When the link 207 (Fig. 6) is moved to the right by the cam 203, as previously described, to rock the segment 208 clockwise, a stud 290 on the link 207 rides along the underside of the pawl 283 and rocks the latter counter-clockwise against the action of the spring 285, until said stud clears a shoulder 291 on said pawl 283. The pawl 283 is then rocked clockwise by the spring 285 to place the shoulder 291 in front of the stud 290 to prevent the return movement of the link 207, under the action of the spring 210. This maintains the segment 208 in the position to which it was moved during the movement of the link 207 towards the right, thereby preventing the rollers 201 from rotating counter-clockwise to feed the slip 90 into the ejecting chute 217. The rollers 201 are thus rendered ineffective until all of the desired data have been printed on the slip 90 and the latter is fed forwardly by the feeding disc 88.

Assuming that the machine is printing a slip 90 having several lines of data such as shown in Fig. 2, the above mechanism prevents the feeding rollers 201 and 221 from feeding the slip into the ejecting chute during the printing of the first three lines.

When the operator is ready to print the last line, he depresses the "total bill" key 25 (Fig. 1) whereupon the machine goes through the usual total operation during which time the disc 274 (Figs. 6 to 8) is positioned under control of the "total bill" key so that a low spot of the periphery of said disc is opposite the feeler finger 288.

It will be remembered that the feeding segment 208 and its operating link 207 are held in their operated positions by the pawl 283.

During this total operation when the shaft 122 and the arm 278 are rocked counter-clockwise by the cam 165, the spring 279 rocks the lever 280 clockwise since there is a low spot on the periphery of the disc 274 opposite the finger 288. Consequently the stud 281 in the lever 280 through its contact with the finger 282 of the pawl 283 rocks said pawl counter-clockwise and disengages the shoulder 291 from the stud 290 on the link 207 whereupon the spring 210, which was held under tension by the pawl 283, drives the link 207 to the left under control of the cam 203, and rocks the feeding segment 208 counter-clockwise which rapidly rotates the feed rollers 201 and 221 to feed the slip 90 into the ejecting chute 217 ready to be ejected by means to be hereinafter described.

The tension rollers 221, as above described, were moved downwardly to press the slip 90 against the feed rollers 201 prior to the above operation.

When a slip is being printed which requires only one line of printing which as above stated requires several operations, then for last operation during which time the amount is printed, the machine is released by depression of the "single amount" key 23. During this operation, this key controls the differential mechanism of Fig. 4 so that the disc 275 is moved into a position whereby a notch is opposite the feeler finger 289 so that the pawl 283 may release its shoulder 291 from the link 207 to permit the spring 210 under control of the cam 203 to feed the slip into the ejecting chute 217 preparatory to its being finally ejected from the machine.

*Ejecting mechanism*

The ejecting mechanism includes a plurality of ejector driving arms 301 (Figs. 6, 9, 10 and 12) secured on a shaft 302, mounted in the frames 33 to 36. Each arm 301 has two flanges 303 which help guide the slip while being ejected. Associated with each of the arms 301 is an ejector arm 304 bifurcated to slide upon a hub of the arm 301. Each arm 304 has a slot 305 through which projects a stud 306 carried by its associated arm 301. Each arm 304 has a channel bar 307 to hold an ejecting block 308 made of rubber or some other suitable resilient material. The driving arm 301 has a recess 309 to facilitate assembling. A tension spring 310 connected to a stud 311 on the arm 304 and a stud 312 on its associated arm 301 normally maintains the stud 306 against the upper end wall of the slot 305, as viewed in Fig. 6, thus holding the arm 304 in a position where the ejecting block 308 will coact with a statement slip of very thin paper stock. The resilient mounting of the arm 304 makes it self-adjusting for ejecting with an equal degree of efficiency statement slips of variable thicknesses. The outer surfaces of the blocks 308 are slightly curved to contact the slips throughout the entire surfaces of said blocks.

The arms 304 are rocked in both directions by the arms 301 through the studs 306 in the arms 301 and the slots 305 in the arms 304. The means for actuating the arms 301 will be presently described.

The ejecting arms 304 and ejecting blocks 308 are arranged in cooperative relation with a plurality of slots 313 (Figs. 9 and 10) located in the ejecting chute 217. The purpose of this arrangement is to enable the ejecting blocks 308 to exert greater pressure on the slip 90 thus insuring its ejection from the machine.

The ejecting arms 301 and shaft 302 (Figs. 6 and 8) are actuated by a cam 321 secured to the shaft 24. The cam 321 receives one complete clockwise rotation during each cycle of operation of the machine. During such movement the periphery of the cam 321 coacts with the roller 322 carried by an arm 323 pivoted on the stud 206, to rock the said arm counter-clockwise. The arm 323 is pivoted to a slide 324. A spring 325 connected to a stud 326 on the slide 324 and to the stud 212 constantly urges the slide to the left to hold the roller 322 against the cam 321.

The slide 324 has a slot 327 through which projects the shaft 302. Secured to one side of the slide 324 is a rack 328 which meshes with a gear 329 secured to the shaft 302. When the arm 323 is rocked counter-clockwise it moves the slide 324 to the right (Figs. 6 and 8) against the action of a spring 325 and rotates the gear 329 and shaft 302 in a clockwise direction. Such clockwise movement of the shaft 302 rocks the ejector driving arms 301 and the ejector arms 304 clockwise to a position in which they are retained by means later described until after the feeding rollers 201 and 221 have fed the slip 90 into the ejector chute 217. The arms 301 are then released to the action of the spring 325, whereupon the ejector arms 304 coact with the slip 90 to eject it from the machine.

After the ejector arms 304 have been rocked clockwise, as above described, the means for retaining them in such moved position until the feeding rollers 201 and 221 have fed the slip 90 into the chute 217, includes a latch 330 (Figs. 8 and 9) rigidly secured to the side of the pawl 283. The latch 330 has a shoulder 331, which is adapted to coact with a stud 332 carried by the slide 324. When the slide 324 is shifted to the right (Fig. 3) by the cam 321, the stud 332 rides along the underside of the latch 330 and cams the latter, and the pawl 283, counter-clockwise against the action of the spring 295. When the stud 332 clears the shoulder 331, the latch 330 is rocked clockwise by the spring 283 and positions the shoulder 331 to the left of the stud 332 and thus holds the slide 324 and arms 301 and 304 in their clockwise moved positions during operations of the machine necessary to print data previous to printing the final amount of the bill.

When the pawl 283 is rocked counter-clockwise under the control of the disc 274 or 275, as previously described, the latch 330 is likewise rocked counter-clockwise to remove the shoulder 331 from the path of the stud 332, thus permitting the slide 324 to be returned to the left by the spring 325 under the control of the cam 321. The cam 321 is so shaped that it will not permit the slide 324 to be returned by the spring 325, as just mentioned, until after the feeding rollers 201 and 221 have completed the operation of feeding the slip 90 into the ejecting chute 217. When the slide 324 is moved to its home position, it rocks ejector driving arms 301 and the ejector arms 304 counter-clockwise whereupon the blocks 307 coact with the slip 90 to feed it out of the ejector chute 217 and deposit it face-downwardly in a receptacle located in front of the machine.

*Receptacle*

Figure 15:
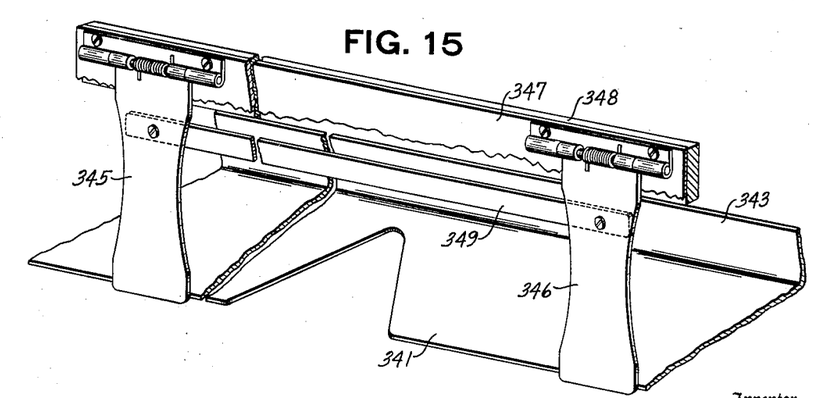
Fig. 15 is a perspective view of the receptacle for receiving the ejected statements.

The receptacle used for receiving the ejected slips is shown in Figs. 6 and 15. This receptacle includes a bottom plate 341 which has its right and left-hand ends bent at right angles to form sides 342, which are secured to the frames 84 and 86. Only one of the sides 342 is shown (Fig. 6). The rear edge of the plate 341 is also bent to form a back 343. The rear bottom edge of the receptacle rests upon a ledge 344 secured to the base 94. The front center portion of a plate 341 is cut away to facilitate the removal of the slips from the receptacle. A pair of spring-pressed retaining arms 345 and 346 are hinged to a guard 347 carried by a cross-bar 348, supported by the frames 84 and 86, and normally serve to maintain the proper stacking of the ejected slips 90 in the receptacle. A tie-bar 349 connects the arms 345 and 346 so that movement of one will move the other when the operator wishes to remove any or all slips from the receptacle.

A suitable cabinet or casing, only a part of which is shown at 350 (Fig. 6), covers the mechanisms described to protect them from dirt and unauthorized manipulation. Suitable doors under lock and key are arranged in convenient locations for proper inspection of the mechanisms.

Operation

A brief description will now be given of the operations necessary to print the data shown on the slip illustrated in Fig. 2.

A slip 90 is manually inserted into the printing mechanism until it is arrested by the stop arms 98. During the first operation the slip 90 is fed to the right by the discs 88 and 91 to position it in line to receive the first printing impression. The code number "11" is then set up on the keys 30, the present reading of "77,800" is set up on the amount keys 29, and the "present" key 26 is depressed, the latter causing the machine to be released for operation. The keys 30 and 29 cause printing wheels 79 associated therewith to be adjusted for printing numbers corresponding to those set up on their respective keys. The "present" key 26 controls the selection of the proper printing hammers 99 to print said numbers in the proper columns on the slip 90. In addition, the "present" key 26 controls the disc 143 (Fig. 3) whereby the pawl 132 retains the slide 108 in its moved position, thereby maintaining the slip 90 in position for further printing on the same line during the next operation of the machine.

After this first operation of the machine, the operator sets up on the amount keys 29 the previous reading of "77,700" and depresses the "previous" key 26. In the same manner as above described, said number is printed in the proper columns on the slip 90 and the latter is retained in position for further printing on the same line.

For the third operation, the amount of consumption, which is "100," is then set up on the amount keys 29, and the "consumed service" key 28 is depressed, causing such amount to be printed in the proper columns of the slip 90 which is still held for further printing on the first line.

For the fourth operation, the operator depresses the "Jan." key 30 for printing the month of the year, and the proper amount keys 29, for setting up the cost of service consumed, amounting in this instance to "$3.50," and also depresses the "multiple amount" key 28. The month and amount are printed on the first line in the proper columns of the slip 90. The "multiple amount" key 28 controls the adjustment of the disc 143 whereby the pawl 132 is disengaged from the shoulder 135 (Fig. 3) thus permitting the slide 108 to return to normal position. Now during the first part of the subsequent operation the pawl 129 (Fig. 4) engages the first tooth 128 and moves the rack 112 to feed the slip 90 one step to the right. The pawl 117 then engages the second tooth 116 to retain the slip in position to receive the next print. This pawl 117 is not released from the rack 112 because the disc 152 (Fig. 4) has no low spot positioned opposite the finger 150 when the multiple amount key 28 is depressed.

For the fifth operation, the amount of arrears, in this example amounting to $1.50, is set up on the amount keys 29 and the "arrears" key 28 depressed. During the first part of this operation the slide 108 moves the rack 112 one step to feed the slip 90 to position it to receive the printing of the amount "1.50." The "arrears" key 28 controls the discs 143 and 152 to cause the slip 90 to be fed another step during the first part of the next operation.

For the sixth operation the credit amount of $4.00 is then set up on the amount keys 29 and the "credit" key 28 depressed and the slip 90 is fed as above stated to position it to receive the print "4.00." During this operation the credit key 28 controls the feeding mechanism in the same manner above described to cause the slip 90 to be fed another line-space during the first part of the next operation of the machine.

To obtain the amount due, in this case $1.00, the operator depresses the "total bill" key 25. The machine performs the necessary calculations and feeds the slip 90 to print the amount due in the proper line on the slip. In addition, the "total bill" key 25 controls the adjustment of the disc 151 to cause the pawls 117 and 132 to be rocked out of cooperative relation with the rack 112 and slide 108 respectively so that during the second cycle of this operation, which is a total taking operation, the slip 90 will be fed to the left into a position to be fed further into the ejecting chute 217 as the rack 112 is returned to the right to its normal position by the spring 103.

The pressure rollers 221 are then moved downwardly into cooperative relation with the feeding rollers 201 and the guide plate 265 is rocked down into a position to guide the slip into the chute 217. The feeding rollers 201 which have been withheld from operation during the several printing operations, by the pawl 283 are then rotated counter-clockwise to feed the slip 90 into the ejecting chute 217.

As soon as the slip 90 has been fed into the chute 217 by the rollers 201 and 221 the ejecting arms 304 are rocked counter-clockwise and the blocks 308 coact with the slip 90 and eject it from the machine, depositing it face-downwardly in the receptacle illustrated in Figs. 6 and 15.

Regardless of the thickness of the slip 90, the ejecting arms 304 will, due to the resilient mounting afforded them by the springs 310, perform with an equal degree of efficiency in ejecting the slip from the machine and depositing it face downwardly in the receptacle.

The "credit balance" key 26 is used as the final operation release key in place of the "total bill" key when the amount of the credit exceeds the sum of the current amount and the amount of arrears.

While the form of mechanism herein shown and described is admirably adapted to fulfill the objects primarily stated, it is to be understood that it is not intended to confine the invention to the form or embodiment herein disclosed, for it is suceptible of embodiment in various forms all coming within the scope of the claims which follow.

What is claimed is:

1. In a machine of the class described, the combination of means to make impressions on record material; means to feed the record material to the printing line and reversely feed the same; another feeding means to feed said record material in the last mentioned direction; ejecting means to eject the record material from the machine after it has been fed by the last mentioned feeding means; and means to control the effectivity of both feeding means and the ejecting means.

2. In a machine of the class described, the combination of means to make impressions on record material; means to feed the record material to the printing line and reversely feed the same; another feeding means to feed said record material in the last mentioned direction; ejecting means to eject the record material from the machine after it has been fed by the last mentioned feeding means; a plurality of manipulative control devices; and means controlled thereby for controlling the operation of the last mentioned feeding means and said ejecting means.

3. In a machine of the class described, the combination of means to make impressions on record material; means to feed the record material to the printing line and reversely feed the same; another feeding means to feed said record material in the last mentioned direction, ejecting means to eject the record material from the machine after it has been fed by the last mentioned feeding means; a device common to and associated with the last mentioned feeding means and the ejecting means to retain said feeding means and ejecting means each in a position to be actuated to feed and eject the record material; and a plurality of manipulative devices to control the effectivity of said device.

4. In a machine of the class described, the combination of a plurality of manipulative control devices; means to make impressions on record material; means to feed the record material into a position to receive said impressions and to reversely feed said material after said impressions have been made; a second feeding means to feed said material still further in the reverse direction upon completion of the first mentioned feeding; and ejecting means operable under control of said manipulative devices to eject and invert said record material upon completion of the second feed.

5. In a machine of the class described, the combination of a plurality of manipulative control devices; means to make impressions on record material; means to feed the record material into a position to receive said impressions and to reversely feed said material after said impressions have been made; a second feeding means to feed said material still further in the reverse direction upon completion of the first mentioned feeding; means under control of said manipulative devices for controlling the actuation of said second feeding means; ejecting means to eject the record material from the machine and invert the same upon completion of the actuation of the second feeding means; and means under control of said manipulative devices for actuating said ejecting means.

6. In a machine of the class described, the combination of manipulative control devices; means to make impressions upon record material; feeding means to feed the record material into a position to receive a plurality of impressions, and to reversely feed said material into position to receive further impressions or into position to be fed still further in said reverse direction under control of said manipulative devices; a second feeding means only operable to feed said record material after all impressions have been made thereon; actuating means for said second feeding means to determine the time of operation of said second feeding means; ejecting and inverting means for the record material operable only after operation of said second feeding means; and means to determine the time of actuation of said ejecting and inverting means.

7. In a machine of the class described, the combination of means to make a plurality of impressions on record material during a variable number of cycles of operation of the machine; means to feed the record material into position to receive a plurality of impressions on a single line during a like number of cycles of operation of the machine, and to feed the record material reversely to receive a plurality of impressions on different lines during a like number of plurality of cycles of operation; a second feeding means to feed the record material in said reverse direction at the end of a variable number of cycles of operation; means to eject and invert the record material during the last mentioned cycle of operation; and means to determine in which cycle of operation said second feeding means and the ejecting and inverting means shall operate.

8. In a machine of the class described, the combination of means to make a plurality of impressions on record material during a variable number of cycles of operation of the machine; means to feed the record material into position to receive a plurality of impressions on a single line during a like number of cycles of operation of the machine, and to feed the record material reversely to receive a plurality of impressions on different lines during a like number of plurality of cycles of operation; a second feeding means to feed the record material in said reverse direction at the end of a variable number of cycles of operation; means to eject and invert the record material during the last mentioned cycle of operation; means to determine in which cycle of operation said second feeding means and the ejecting and inverting means shall operate; a plurality of manipulative control devices; means controlled thereby for controlling the variable feeding of the first mentioned feeding means; and means also controlled by said manipulative devices for controlling said determining means.

9. In a machine of the class described, the combination of a plurality of manipulative control devices; means to make impressions upon record material; a first feeding means to feed said record material a constant distance in one direction from a starting position and thereafter variable distances in said one direction, and then back to starting position in a reverse direction; a second feeding means to feed the material farther in said reverse direction; means receiving the material from the second feeding means and operable to eject and invert said material after the completion of the above feeding movements of the record material; means under control of said manipulative device for controlling said first feeding means; and means under control of said manipulative devices for controlling the second feeding means and the ejecting and inverting means.

10. In a machine of the class described, the combination of means to make impressions on record material and to feed the same into position to receive a variable number of impressions; a feeding device adapted to be moved into a position to feed the record material after the completion of any variable number of impressions made thereon; means for latching said feeding device in said position; means to release said latching means to feed said record material upon the completion of any variable number of impressions; a plurality of manipulative devices to control said latch releasing means; an ejecting device normally ineffective but moved into an effective position during the making of the first impressions on record material; and means actuated by said latching means to latch said ejecting means in its moved position and retain it in said position until after the said feeding device is operated.

11. In a machine of the class described, the combination of means to make impressions on record material and to feed the same into position to receive a variable number of impressions; a feeding device adapted to be moved into a position to feed the record material after the completion of any variable number of impressions made thereon; a device for latching said feeding device in said position; means to release said latching device upon the completion of any variable number of impressions to feed said record material; a plurality of manipulative devices; an ejecting device normally ineffective but moved into an effective position during the making of the first impressions on record material; means actuated by said latching device to latch said ejecting means in its moved position and retain it in said position until after the said feeding device is operated; and means controlled by said manipulative devices to control the releasing of said latch device and said latching means.

12. In a machine of the class described, the combination of means to make impressions on record material; means to feed the record material to the printing line and reversely feed the same; a second feeding means to feed said record material in the last mentioned direction; actuating means for the second feeding means; means to drive the actuating means and the second feeding means idly to set the same in position ready to feed the record material; means to retain the actuating means and the second feeding means in said position; means to eject the record material; actuating means for the ejecting means; means to drive the actuating means idly to set the same in position ready to eject the record material; means to retain the ejecting actuating means in said position; and means to control both of said retaining means:

13. In a machine of the class described, the combination of means to make impressions on record material; means to feed the record material to the printing line and reversely feed the same; a second feeding means to feed said record material in the last mentioned direction; actuating means for the second feeding means; means to drive the actuating means and the second feeding means idly to set the same in position ready to feed the record material; means to retain the actuating means and the second feeding means in said position; means to eject the record material; actuating means for the ejecting means; means to drive the actuating means idly to set the same in position ready to eject the record material; means to retain the ejecting actuating means in said position; means to release both of said retaining means; and means to control the effectivity of said releasing means.

14. In a machine of the class described, the combination of means to make impressions on record material; means to feed the record material to the printing line and reversely feed the same; a feeding device to feed said record material in the last mentioned direction; ejecting means to eject the record material from the machine after it has been fed by the last mentioned feeding means; and a plurality of differentially adjusting elements to control the effectivity of said feeding means, said feeding device, and said ejecting means.

15. In a machine of the class described, the combination of means to make a plurality of impressions on record material during a variable number of cycles of operation of the machine; means to feed the record material to the printing line and reversely feed the same; a feeding device to feed said record material further in the last mentioned direction; ejecting means to eject the record material from the machine; and a plurality of manipulative devices to determine the number of cycles of operation of the machine and to simultaneously determine in which of said cycles of operation the feeding means, the feeding device, and ejecting means shall operate.

16. In a machine of the class described, the combination of means to make a plurality of impressions on record material during a variable number of cycles of operation of the machine; means to feed the record material to the printing line and reversely feed the same; a feeding device to feed said record material further in the last mentioned direction; ejecting means to eject the record material from the machine; a plurality of manipulative devices to determine the number of cycles of operation of the machine; and a plurality of differentially adjustable elements to cause said feeding means to operate during certain cycles of operation and to cause said feeding means and said ejecting means to operate during a different cycle of operation.

17. In a machine adapted to print on insertable record material of different thicknesses, the combination of an oscillating ejector element; a friction device; a member carrying said device and slidably mounted on said element; and resilient means connecting the element and member to render the latter self-adjusting on the element for ejecting from the machine with an equal degree of efficiency record materials of different thicknesses.

18. In a machine adapted to print on insertable record material, the combination of an ejecting guide chute having formed therein a plurality of elongated openings; feeding mechanism for feeding said material into said chute; and a plurality of resiliently mounted members coacting with the openings in said chute to eject the material therefrom.

19. In a machine adapted to print on record material, the combination of manipulative devices; an ejecting guide chute; a receptacle; means under control of said devices for feeding the material in the chute; and a plurality of resiliently mounted members under control of said devices for ejecting said material from the chute and depositing it in inverted order in the receptacle.

20. In a machine adapted to print data on record material, the combination of manipulative devices; a curved ejecting guide chute having formed therein a plurality of elongated openings; a receptacle; means operable under control of said devices for feeding the material into said chute; a plurality of oscillating ejector elements operable under control of said devices; and yieldable members carried by said elements and yieldably coacting with the openings in the chute to eject said material from the chute and deposit it in inverted order in the receptacle.

21. In a machine adapted to print on record materials of variable thicknesses, the combination of an ejecting guide chute having formed therein an elongated opening; mechanism for feeding the material into the chute; an oscillating ejector element; a friction device; a member carrying said device and slidably mounted on said element; and resilient means connecting the element and member to cause the latter to coact with the opening in said chute to eject therefrom with an equal degree of efficiency record materials of variable thicknesses.

22. In a machine adapted to print on record materials of variable thicknesses, the combination of manipulative devices; an ejecting guide chute having formed therein an elongated opening; mechanism operable under control of said manipulative devices for feeding said materials into the chute; an oscillating ejector element operable under control of said manipulative devices; a friction device; a member carrying said friction device and slidably mounted on said element; and resilient means connecting the element and member to cause the friction device to coact with the opening in said chute to eject therefrom with equal degree of efficiency the materials of variable thicknesses.

23. In a machine adapted to print on record materials of variable thicknesses, the combination of an ejecting guide chute having formed therein an elongated opening; feeding mechanism for feeding said materials into said chute; an oscillating ejector element; a member slidably mounted on said element and adjustable relatively thereto to coact with the opening in said chute to eject therefrom said materials; and resilient means connecting the element and member to render the latter self-adjusting for ejecting from said chute with equal degree of efficiency record materials of variable thicknesses.

24. In a machine of the class described, the combination of means to make impressions on record material during a variable number of cycles of operation of the machine and to feed the same into position to receive such impressions; a self-adjusting ejecting device normally in an ineffective position; means to move said device into an effective position during the first cycle of operation; means to latch said ejecting device in its effective position; and means to determine during which cycle said ejecting device is to be released to be returned to its normal position to eject the record material.

25. In a machine of the class described, the combination of means to make impressions upon record material and feed the same prior to and after such impressions; self-adjusting ejecting means normally in an ineffective position; means to move the ejecting means into a position ready to eject the record material; means to latch the ejecting means in such position; means to control the operation of said latch to release said ejecting means; and means to restore the ejecting means to its normal position upon the release thereof whereupon the ejecting means adjusts itself to the thickness of the record material being used and ejects the same from the machine.

26. In a machine of the class described, the combination of means to make impressions on record material and feed the same before and after such impressions; record material guiding means having an opening therein; a self-adjusting ejecting device normally in an ineffective position; means to move said device into an effective position to form a guide for the record material; and means to return the ejecting means to its normal position whereby through its contact with the record material in cooperation with the opening in said guide, said ejecting means ejects the material from the machine regardless of the thickness of such material.

JOHN EARL GATES.